(12) United States Patent
Matsuda

(10) Patent No.: US 9,840,306 B2
(45) Date of Patent: Dec. 12, 2017

(54) ELECTRIC VEHICLE, AND BATTERY PACK

(71) Applicant: KAWASAKI JUKOGYO KABUSHIKI KAISHA, Kobe-shi, Hyogo (JP)

(72) Inventor: Yoshimoto Matsuda, Kobe (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 245 days.

(21) Appl. No.: 14/433,376

(22) PCT Filed: Oct. 3, 2012

(86) PCT No.: PCT/JP2012/006333
§ 371 (c)(1),
(2) Date: Apr. 2, 2015

(87) PCT Pub. No.: WO2014/054069
PCT Pub. Date: Apr. 10, 2014

(65) Prior Publication Data
US 2015/0280467 A1    Oct. 1, 2015

(51) Int. Cl.
*H02G 3/00* (2006.01)
*B62M 7/02* (2006.01)
(Continued)

(52) U.S. Cl.
CPC ............ *B62M 7/02* (2013.01); *B60K 1/04* (2013.01); *B60L 3/0046* (2013.01); *B60L 3/12* (2013.01);
(Continued)

(58) Field of Classification Search
CPC ............ Y02T 10/7005; Y02T 10/7055; Y02T 10/7044; Y02T 90/14
See application file for complete search history.

(56) References Cited

U.S. PATENT DOCUMENTS 5,646,534 A * 7/1997 Kopera ............... B60L 11/1851
324/431
6,006,944 A    12/1999 Machledt
(Continued)

FOREIGN PATENT DOCUMENTS

EP    1389552 A1    2/2004
EP    1786057 A2    5/2007
(Continued)

OTHER PUBLICATIONS

United States Patent and Trademark Office, Office Action Issued in U.S. Appl. No. 14/433,374, dated Jul. 31, 2015, 11 pages.
(Continued)

*Primary Examiner* — Sibin Chen
(74) *Attorney, Agent, or Firm* — Alleman Hall Creasman & Tuttle LLP

(57) ABSTRACT

A saddle-riding electric vehicle includes a battery pack mounted to a vehicle body. The vehicle body can run in a state where the battery pack is removed from the vehicle body. The battery pack includes: a casing; removably mounted to the vehicle body; a battery accommodated in the casing; a running-phase power feeding connector provided on the casing and electrically connectable to a vehicle-body-side power feeding connector in a state where the casing is mounted to the vehicle body; an in-storage charging connector provided on the casing, disposed at a position different from that of the running-phase power feeding connector, and electrically connectable to an external power supply; and a battery monitoring unit accommodated in the casing and configured to monitor a state of the battery.

13 Claims, 6 Drawing Sheets

(51) Int. Cl.
  *H01M 2/10* (2006.01)
  *H01M 10/48* (2006.01)
  *B60L 11/18* (2006.01)
  *B60L 3/00* (2006.01)
  *B60L 3/12* (2006.01)
  *B62D 65/00* (2006.01)
  *G01M 17/007* (2006.01)
  *B62K 19/30* (2006.01)
  *B62K 19/34* (2006.01)
  *H02J 7/00* (2006.01)
  *B62K 11/04* (2006.01)
  *B62K 25/28* (2006.01)
  *B60K 1/04* (2006.01)

(52) U.S. Cl.
  CPC ....... *B60L 11/1803* (2013.01); *B60L 11/1816* (2013.01); *B60L 11/1818* (2013.01); *B60L 11/1822* (2013.01); *B60L 11/1859* (2013.01); *B60L 11/1861* (2013.01); *B60L 11/1868* (2013.01); *B60L 11/1877* (2013.01); *B60L 11/1879* (2013.01); *B62D 65/005* (2013.01); *B62K 11/04* (2013.01); *B62K 19/30* (2013.01); *B62K 19/34* (2013.01); *B62K 25/283* (2013.01); *G01M 17/007* (2013.01); *H01M 2/1072* (2013.01); *H01M 2/1083* (2013.01); *H01M 10/48* (2013.01); *H02J 7/0022* (2013.01); *B60K 2001/0455* (2013.01); *B60K 2001/0461* (2013.01); *B60L 2200/12* (2013.01); *B60L 2230/10* (2013.01); *B60L 2230/16* (2013.01); *B60L 2240/545* (2013.01); *B60L 2270/40* (2013.01); *B60Y 2200/12* (2013.01); *B62K 2204/00* (2013.01); *B62K 2208/00* (2013.01); *H01M 2220/20* (2013.01); *Y02T 10/7005* (2013.01); *Y02T 10/7044* (2013.01); *Y02T 10/7066* (2013.01); *Y02T 10/7088* (2013.01); *Y02T 90/124* (2013.01); *Y02T 90/128* (2013.01); *Y02T 90/14* (2013.01); *Y02T 90/163* (2013.01); *Y10T 29/49004* (2015.01); *Y10T 29/49108* (2015.01); *Y10T 29/49117* (2015.01)

(56) References Cited

U.S. PATENT DOCUMENTS

| | | |
|---|---|---|
| 9,308,966 B2 | 4/2016 | Kosuge et al. |
| 2003/0094324 A1 | 5/2003 | Huang |
| 2006/0255755 A1 | 11/2006 | Shu et al. |
| 2007/0247106 A1 | 10/2007 | Kawahara et al. |
| 2009/0255747 A1 | 10/2009 | Kasaba et al. |
| 2010/0078247 A1 | 4/2010 | Sasage et al. |
| 2010/0230188 A1 | 9/2010 | Nguyen |
| 2011/0012604 A1* | 1/2011 | Tsujiko ............ H01M 10/48 324/427 |
| 2011/0066309 A1 | 3/2011 | Matsuoka et al. |
| 2011/0144844 A1 | 6/2011 | Ishibashi |
| 2011/0259660 A1* | 10/2011 | Johnson ............ B62K 11/04 180/220 |
| 2012/0013180 A1 | 1/2012 | Muto et al. |
| 2012/0015221 A1 | 1/2012 | Murase et al. |
| 2012/0118659 A1 | 5/2012 | Shinde et al. |
| 2012/0119749 A1 | 5/2012 | Iida |
| 2013/0032427 A1 | 2/2013 | Ishikawa et al. |
| 2013/0110340 A1* | 5/2013 | Park ............ B60L 11/1816 701/22 |
| 2013/0264134 A1 | 10/2013 | Matsuda |
| 2013/0299265 A1 | 11/2013 | Marazzi |
| 2014/0091751 A1* | 4/2014 | Workman ............ H02J 7/0013 320/106 |
| 2015/0251540 A1 | 9/2015 | Matsuda |
| 2015/0251716 A1 | 9/2015 | Matsuda |

FOREIGN PATENT DOCUMENTS

| | | |
|---|---|---|
| EP | 2479069 A1 | 7/2012 |
| EP | 2479091 A1 | 7/2012 |
| JP | S58004326 A | 1/1983 |
| JP | H03281490 A | 12/1991 |
| JP | H04201687 A | 7/1992 |
| JP | H08058656 A | 3/1996 |
| JP | H09163620 A | 6/1997 |
| JP | 2000115902 A | 4/2000 |
| JP | 2001138976 A | 5/2001 |
| JP | 2002025631 A | 1/2002 |
| JP | 2002240765 A | 8/2002 |
| JP | 2002268913 A | 9/2002 |
| JP | 2003127941 A | 5/2003 |
| JP | 2003182669 A | 7/2003 |
| JP | 2003189539 A | 7/2003 |
| JP | 2003267278 A | 9/2003 |
| JP | 2004362949 A | 12/2004 |
| JP | 2006205894 A | 8/2006 |
| JP | 2007083953 A | 4/2007 |
| JP | 2008104257 A | 5/2008 |
| JP | 2009165210 A | 7/2009 |
| JP | 2009283457 A | 12/2009 |
| JP | 2010022155 A | 1/2010 |
| JP | 2010080135 A | 4/2010 |
| JP | 2010083332 A | 4/2010 |
| JP | 2010100124 A | 5/2010 |
| JP | 2010208382 A | 9/2010 |
| JP | 2010239705 A | 10/2010 |
| JP | 2011076903 A | 4/2011 |
| JP | 2011160567 A | 8/2011 |
| JP | 2012050272 A | 3/2012 |
| JP | 2012060705 A | 3/2012 |
| JP | 2012068887 A | 4/2012 |
| JP | 2012131414 A | 7/2012 |
| JP | 2012144178 A | 8/2012 |
| JP | 2013147153 A | 8/2013 |
| WO | 2012014968 A1 | 2/2012 |
| WO | 2012032621 A1 | 3/2012 |
| WO | 2012063292 A1 | 5/2012 |
| WO | 2012070109 A1 | 5/2012 |
| WO | 2012104592 A1 | 8/2012 |

OTHER PUBLICATIONS

European Patent Office, Extended European Search Report Issued in Application No. 13843645.6, dated Apr. 22, 2016, 8 pages.
Boussely, M. et al., "Main aging mechanisms in Li ion batteries," Journal of Power Sources, vol. 146, No. 1-2, Aug. 2005, Available Online May 31, 2005, 7 pages.
European Patent Office, Extended European Search Report Issued in Application No. 13843610.0, dated May 13, 2016, 12 pages.
European Patent Office, Extended European Search Report Issued in Application No. 12886007.9, dated Jun. 3, 2016, 10 pages.
European Patent Office, Extended European Search Report Issued in Application No. 13844155.5, dated Jun. 9, 2016, 11 pages.
ISA Japanese Patent Office, International Search Report Issued in Japanese Patent Application PCT/JP20121006333, dated Jan. 15, 2013, WIPO, 2 pages.
ISA Japanese Patent Office, International Search Report Issued in Japanese Patent Application PCT/JP2013/004115, dated Sep. 3, 2013, WIPO, 2 pages.
ISA Japanese Patent Office, International Search Report Issued in Japanese Patent Application PCT/JP20131004116, dated Oct. 1, 2013, WIPO, 2 pages.
ISA Japanese Patent Office, International Search Report Issued in Japanese Patent Application PCT/JP20131004117, dated Oct. 1, 2013, WIPO, 2 pages.
European Patent Office, Office Action Issued in Application No. 12888007.9, dated May 15, 2017, Netherlands, 8 pages.

* cited by examiner

ELECTRIC VEHICLE, AND BATTERY PACK

TECHNICAL FIELD

The present invention relates to an electric vehicle and a battery pack mounted to a vehicle body of the electric vehicle.

BACKGROUND ART

An electric vehicle includes an electric motor for driving the rotation of a wheel of the electric vehicle, and it is necessary that a battery serving as a power supply for the electric motor be mounted in the electric vehicle. Patent Literature 1 discloses a charging technique, in which a battery charger is always connected to the battery while the vehicle is in storage since the state of charge of the battery decreases due to self-discharge even though the battery is simply left unused. In the charging technique of Patent Literature 1, the battery charger is connected to the battery in a state where the battery is mounted to the vehicle body.

CITATION LIST

Patent Literature

PTL 1: Japanese Laid-Open Patent Application Publication No. H09-163620

SUMMARY OF INVENTION

Technical Problem

Conventionally, before an engine-mounted vehicle is put on the market, a running test of the engine-mounted vehicle in an assembled state is performed on a test bench. The vehicle that has passed the test for various test items is regarded as a product. After the running test on the test bench is completed, the product may be stored as a stock item in a vehicle factory or a dealer's store until the product is delivered to a user.

Also in the case of an electric vehicle, a running test of the vehicle on a test bench may be performed, and the product may be stored as a stock item before it is sold. The battery of such an electric vehicle self-discharges while the battery is simply left unused, and over-discharging of the battery causes significant deterioration in the quality of the battery. Therefore, in inventory management of such electric vehicles, maintenance of the battery, such as maintaining the state of charge, is important for preventing the deterioration in the quality of the battery.

As described above, not only is the electric vehicle put in storage after being delivered to the user, but the electric vehicle may be stored as a stock item before being delivered to the user. The charging technique of Patent Literature 1 is intended only for the storage after the product is delivered to the user. However, if the charging technique of Patent Literature 1 is applied to inventory management of electric vehicles, in this case, battery chargers need to be always connected to a large number of batteries, respectively, in a state where each battery is mounted to a corresponding vehicle body. Therefore, the inventory management of the electric vehicles becomes very complex and cumbersome.

In view of the above, an object of the present invention is to facilitate inventory management of electric vehicles.

Solution to Problem

An electric vehicle according to the present invention includes: a vehicle body including a wheel and an electric motor configured to drive rotation of the wheel; and a battery pack mounted to the vehicle body. The vehicle body includes: a vehicle-body-side power feeding connector configured to supply electric power to the electric motor; and a vehicle control unit configured to control the electric motor. The vehicle body can run when electric power is supplied to the electric motor from the vehicle-body-side power feeding connector. The battery pack includes: a casing removably mounted to the vehicle body; a battery accommodated in the casing and serving as a power supply for the electric motor; a running-phase power feeding connector provided on the casing, electrically connected to the battery, and electrically connectable to the vehicle-body-side power feeding connector in a state where the casing is mounted to the vehicle body; an in-storage charging connector provided on the casing, disposed at a position different from that of the running-phase power feeding connector, electrically connected to the battery, and electrically connectable to an external power supply; and a battery monitoring unit accommodated in the casing and configured to monitor a state of the battery.

According to the above configuration, even in a state where the battery pack is removed from the vehicle body, the vehicle body becomes able to run when an external power supply is connected to the vehicle-body-side power feeding connector and electric power is thereby supplied to the electric motor. Therefore, even in a state where the battery pack is removed from the vehicle body, a running test of the vehicle body can be performed on a test bench with the vehicle control unit in operation. The in-storage charging connector is provided on the casing, and the battery monitoring unit is accommodated in the casing. By using the connector and the unit, even in a state where the battery pack is removed from the vehicle body, charge/discharge tests of the battery can be performed without removing the battery from the battery pack.

During an inventory period, the battery pack and the vehicle body can be stored independently of each other. Even in a state where the battery pack is removed from the vehicle body, the battery can be charged by connecting the external power supply to the in-storage charging connector. Since the charging work can be performed on the battery pack without involving the vehicle body, the inventory management of the batteries can be readily performed.

The in-storage charging connector is used for charging the battery during an inventory period, whereas the running-phase power feeding connector is used for supplying electric power from the battery to the electric motor in a state where the battery pack is mounted to the vehicle body. The in-storage charging connector and the running-phase power feeding connector are separately prepared and arranged at different positions, respectively. Accordingly, the running-phase power feeding connector can be disposed suitably for the mounting state of the battery pack on the vehicle body, and the in-storage charging connector can be disposed suitably for the storage state of the battery pack. For example, the in-storage charging connector can be disposed at a position that is readily accessible when the battery pack is in storage, and the running-phase power feeding connector can be disposed at a position at which the battery pack in a state of being mounted to the vehicle body can be readily connected to the vehicle-body-side power feeding connector. This makes it possible to both facilitate the inventory management and improve the efficiency in the work of mounting the battery pack to the vehicle body.

The in-storage charging connector may be disposed such that the in-storage charging connector is electrically connectable to the external power supply in a state where the casing is mounted to the vehicle body.

According to the above configuration, in a state where the battery pack is mounted to the vehicle body (when the vehicle is in an assembled state), the in-storage charging connector can be utilized as a connector for charging the battery.

The vehicle body may include: a vehicle-body-side electric component configured to operate at a voltage lower than a drive voltage of the electric motor; and a vehicle-body-side input connector configured to supply electric power to the vehicle-body-side electric component. The battery pack may include: a pack-side electric component provided in the casing and configured to operate at a voltage lower than the drive voltage; and a pack-side input connector configured to supply electric power to the pack-side electric component.

According to the above configuration, even in a state where the battery pack is removed from the vehicle body, by connecting an external power supply to the vehicle-body-side input connector, a running test of the vehicle body on a test bench can be performed while supplying electric power to the vehicle-body-side electric component. Therefore, when the running test on the test bench is performed in a state where the battery pack is removed from the vehicle body, an operation check of the vehicle-body-side electric component can be performed. Similarly, by connecting an external power supply to the pack-side input connector, an operation check of the pack-side electric component, charge/discharge tests of the battery, and charging of the battery for maintenance can be performed even in a state where the battery pack is removed from the vehicle body.

The battery pack may include: a step-down circuit connected to the battery and configured to step down a voltage of the battery; and an output-side connector electrically connected to the vehicle-body-side input connector in a state where the casing is mounted to the vehicle body, the output-side connector being configured to supply electric power, whose voltage has been stepped down by the step-down circuit, to the vehicle-body-side input connector.

According to the above configuration, even in a state where the battery pack is removed from the vehicle body, an operation check of the step-down circuit can be performed by connecting an external detector to the output-side connector.

The output-side connector may be in proximity to the vehicle-body-side input connector in a state where the casing is mounted to the vehicle body, and at least one of the output-side connector and the vehicle-body-side input connector may be connected to a body side thereof via a flexible cable.

According to the above configuration, at least one of the output-side connector and the vehicle-body-side input connector is connected to the body side thereof via the cable. (Specifically, the body side of the output-side connector is a component of the battery pack, and the body side of the vehicle-body-side input connector is a component of the vehicle body.) Therefore, even if the battery pack is mounted to the vehicle body with a mounting precision that is not particularly high, these connectors can be readily attached or detached. Since the output-side connector is in proximity to the vehicle-body-side input connector, the cable connecting to at least one of these connectors can be made short.

The running-phase power feeding connector may be in proximity to the vehicle-body-side power feeding connector in a state where the casing is mounted to the vehicle body, and at least one of the running-phase power feeding connector and the vehicle-body-side power feeding connector may be connected to a body side thereof via a flexible cable.

According to the above configuration, at least one of the running-phase power feeding connector and the vehicle-body-side power feeding connector is connected to the body side thereof via the cable. (Specifically, the body side of the running-phase power feeding connector is a component of the battery pack, and the body side of the vehicle-body-side power feeding connector is a component of the vehicle body.) Therefore, even if the battery pack is mounted to the vehicle body with a mounting precision that is not particularly high, these connectors can be readily attached or detached. Since the running-phase power feeding connector is in proximity to the vehicle-body-side power feeding connector, the cable connecting to at least one of these connectors can be made short.

A pack accommodating space, in which the battery pack is accommodated, may be formed in the vehicle body, and an area that includes the pack accommodating space and a space above the pack accommodating space may be formed such that, in the area, a dimension in a forward and rearward direction increases along an upward direction.

According to the above configuration, by vertically moving the battery pack relative to the vehicle body, the battery pack can be inserted into or removed from the pack accommodating space without interfering with the vehicle body.

The vehicle body may include: a vehicle body frame; a front wheel; a front wheel supporting arm extending forward from the vehicle body frame and configured to support the front wheel in such a manner as to allow the front wheel to make angular displacement about a front-wheel-side pivot shaft; and a handlebar configured to rotate about a steering rotational axis. The steering rotational axis may be such that the higher the elevation from an intersection point of the steering rotational axis with a caster axis is, the more forward the steering rotational axis is from the caster axis.

According to the above configuration, the handlebar is disposed as far forward as possible. As a result, of the space below the handlebar, the space that is obscured by the handlebar when seen in plan view can be reduced. This makes it possible to both increase the size of the battery pack in the forward and rearward direction and readily mount and remove the battery pack.

A battery pack for use in an electric vehicle, according to the present invention, is mounted to a vehicle body, the vehicle body including a wheel, an electric motor configured to drive rotation of the wheel, a vehicle-body-side power feeding connector configured to supply electric power to the electric motor, and a vehicle control unit configured to control the electric motor. The battery pack includes: a casing removably mounted to the vehicle body; a battery accommodated in the casing and serving as a power supply for the electric motor; an running-phase power feeding connector provided on the casing, electrically connected to the battery, and electrically connectable to the vehicle-body-side power feeding connector in a state where the casing is mounted to the vehicle body; an in-storage charging connector provided on the casing, disposed at a position different from that of the running-phase power feeding connector, electrically connected to the battery, and electrically connectable to an external power supply; and a battery monitoring unit accommodated in the casing and configured to monitor a state of the battery.

According to the above configuration, similar to the electric vehicle according to the present invention, a running test of the vehicle body on a test bench and charge/discharge tests of the battery pack can be performed in a state where the battery pack is removed from the vehicle body. During an inventory period, the vehicle body and the battery pack can be stored independently of each other, and the charging work can be performed on the battery pack without involving the vehicle body. This facilitates the inventory management of the electric vehicles. The connectors can be arranged suitably for the mounting state of the battery pack on the vehicle body and the storage state of the battery pack, respectively. This makes it possible to both facilitate the inventory management and improve the efficiency in the work of mounting the battery pack to the vehicle body.

Advantageous Effects of Invention

As is clear from the above description, the present invention makes it possible to facilitate inventory management of electric vehicles.

DESCRIPTION OF EMBODIMENTS

Figure 1:
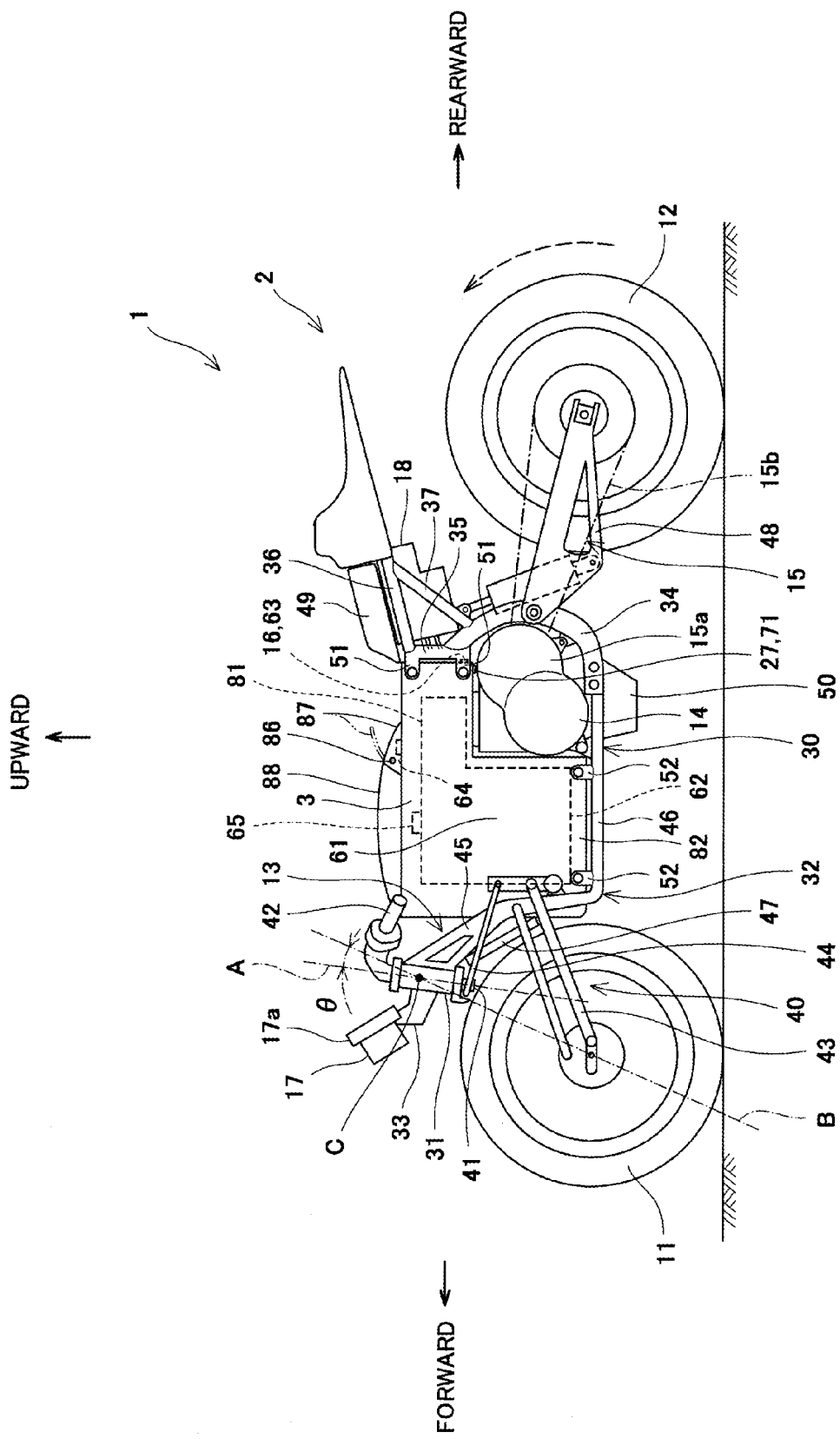
FIG. 1 is a left side view of an electric motorcycle, which is one example of an electric vehicle according to one embodiment of the present invention.

Hereinafter, one embodiment of the present invention is described with reference to the drawings. In the drawings, the same or corresponding elements are denoted by the same reference signs, and repeating the same descriptions is avoided below. Directions mentioned in the embodiment below are directions from the perspective of a rider straddling an electric motorcycle, which is one example of an electric vehicle according to the embodiment of the present invention.

Figure 2:
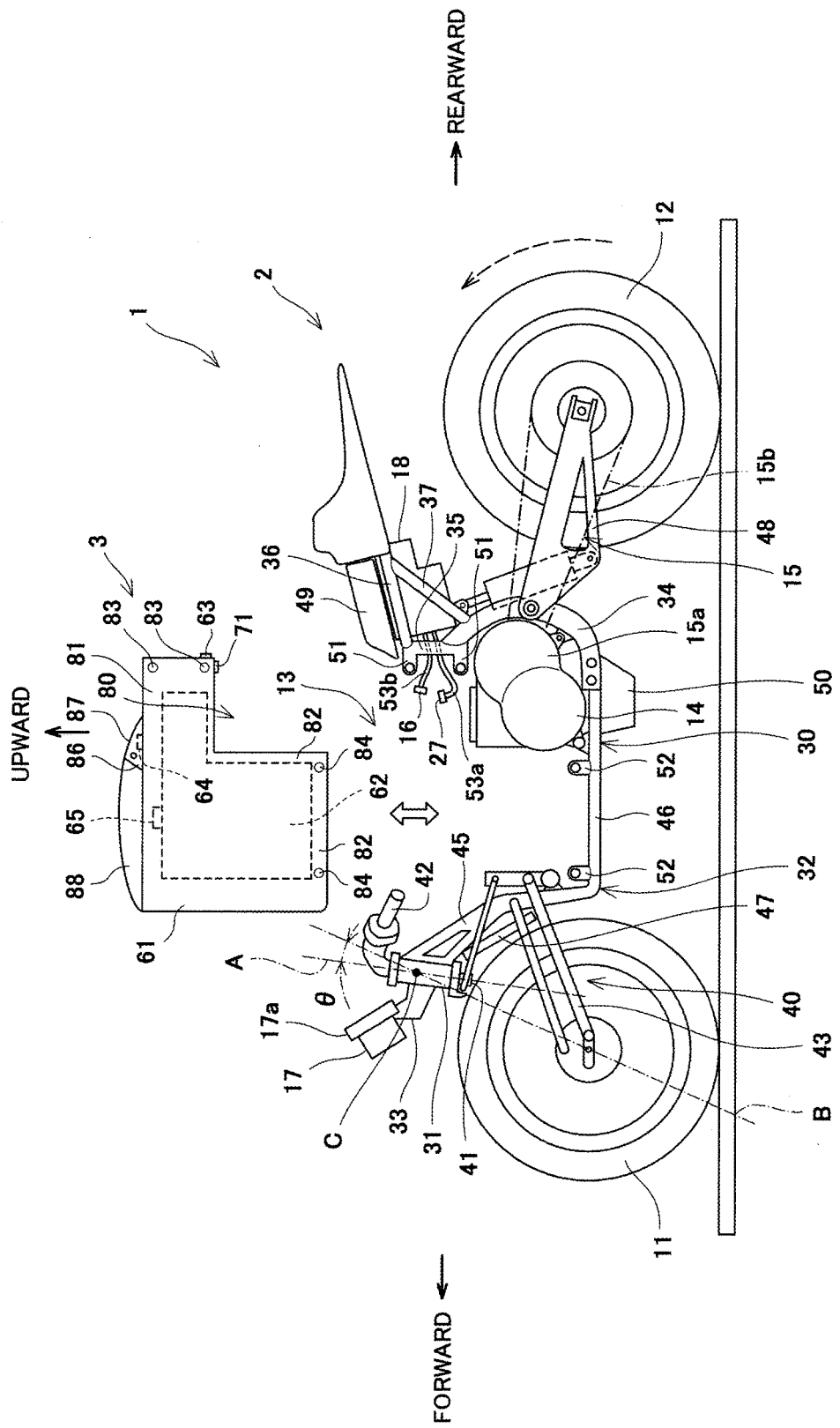
FIG. 2 is a left side view of the electric motorcycle of FIG. 1, showing a state where a vehicle body and a battery pack are removed from each other.

FIG. 1 is a left side view of an electric motorcycle 1, which is one example of the electric vehicle according to the embodiment of the present invention. The left side view shows a state where a battery pack 3 is mounted to a vehicle body 2. FIG. 2 is a left side view of the electric motorcycle 1 of FIG. 1, showing a state where the battery pack 3 is removed from the vehicle body 2.

As shown in FIG. 1 and FIG. 2, the electric motorcycle 1 according to the present embodiment includes the vehicle body 2 and the battery pack 3. The battery pack 3 is removably mounted to the vehicle body 2. The vehicle body 2 includes a front wheel 11 and a rear wheel 12. A pack accommodating space 13, in which the battery pack 3 is accommodated, is formed between the front and rear wheels 11 and 12. With the battery pack 3 accommodated in the pack accommodating space 13, at least one connector provided on the battery pack 3 (e.g., an running-phase power feeding connector 63) is mechanically and electrically connected to a corresponding connector provided on the vehicle body 2 (e.g., a vehicle-body-side power feeding connector 16), and the battery pack 3 is fixed to the vehicle body 2 by using fixing members. In this manner, the battery pack 3 becomes mounted to the vehicle body 2. Conversely, by releasing the fixing of the battery pack 3 to the vehicle body 2 via the fixing members, detaching the connector of the battery pack 3 from the connector of the vehicle body 2, and removing the battery pack 3 from the pack accommodating space 13, the battery pack 3 becomes removed from the vehicle body 2.

The electric motorcycle 1 according to the present embodiment includes no internal combustion engine. The rotation of the rear wheel 12 is driven by motive power for running, which is generated by an electric motor 14. In the present embodiment, the motive power for running, which is generated by the electric motor 14, is transmitted to the rear wheel 12 via a power transmission mechanism 15, which includes a transmission 15a, a chain 15b, etc. It should be noted that the vehicle body 2 is provided with the power transmission mechanism 15.

The battery pack 3 includes: a casing 61 removably mounted to the vehicle body 2; and a battery 62 accommodated in the casing 61. The battery 62 serves as a power supply for the electric motor 14 in a state where the battery pack 3 is mounted to the vehicle body 2.

The battery pack 3 further includes the running-phase power feeding connector 63, an in-storage charging connector 64, and a battery monitoring unit 65. These connectors 63 and 64 are both provided on the casing 61, and are electrically connected to the battery 62. The battery monitoring unit 65 is an electronic device configured to monitor the state of the battery 62 (e.g., the SOC and the temperature of the battery 62), and is accommodated in the casing 61. The in-storage charging connector 64 is electrically connectable to an external power supply 91 (see FIG. 3). When the in-storage charging connector 64 is electrically connected to the external power supply 91, the battery 62 can be charged with electric power from the external power supply 91 (see FIG. 3).

The vehicle body 2 further includes: the vehicle-body-side power feeding connector 16 for supplying electric power to the electric motor 14; and a vehicle control unit 17 configured to control the electric motor 14. The vehicle-body-side power feeding connector 16 is mechanically and electrically connectable to the running-phase power feeding connector 63, and thereby can be supplied with electric power from the battery 62 of the battery pack 3. Even in a state where the battery pack 3 is removed from the vehicle body 2, the vehicle-body-side power feeding connector 16 can be electrically and mechanically connected to a connector 102 (see FIG. 4), which is connected to an external high-voltage power supply 101 (see FIG. 4), and thereby can be supplied with electric power from the external high-voltage power supply 101. When the vehicle-body-side power feeding connector 16 is supplied with electric power, the electric motor 14 can be supplied with the electric power from the vehicle-body-side power feeding connector 16. Even in a state where the battery pack 3 is removed from the vehicle body 2, when the electric motor 14 is supplied with electric power, the vehicle body 2 can run in a self-supporting upright state where only the front and rear wheels 11 and 12 are in contact with the ground.

Figure 4:
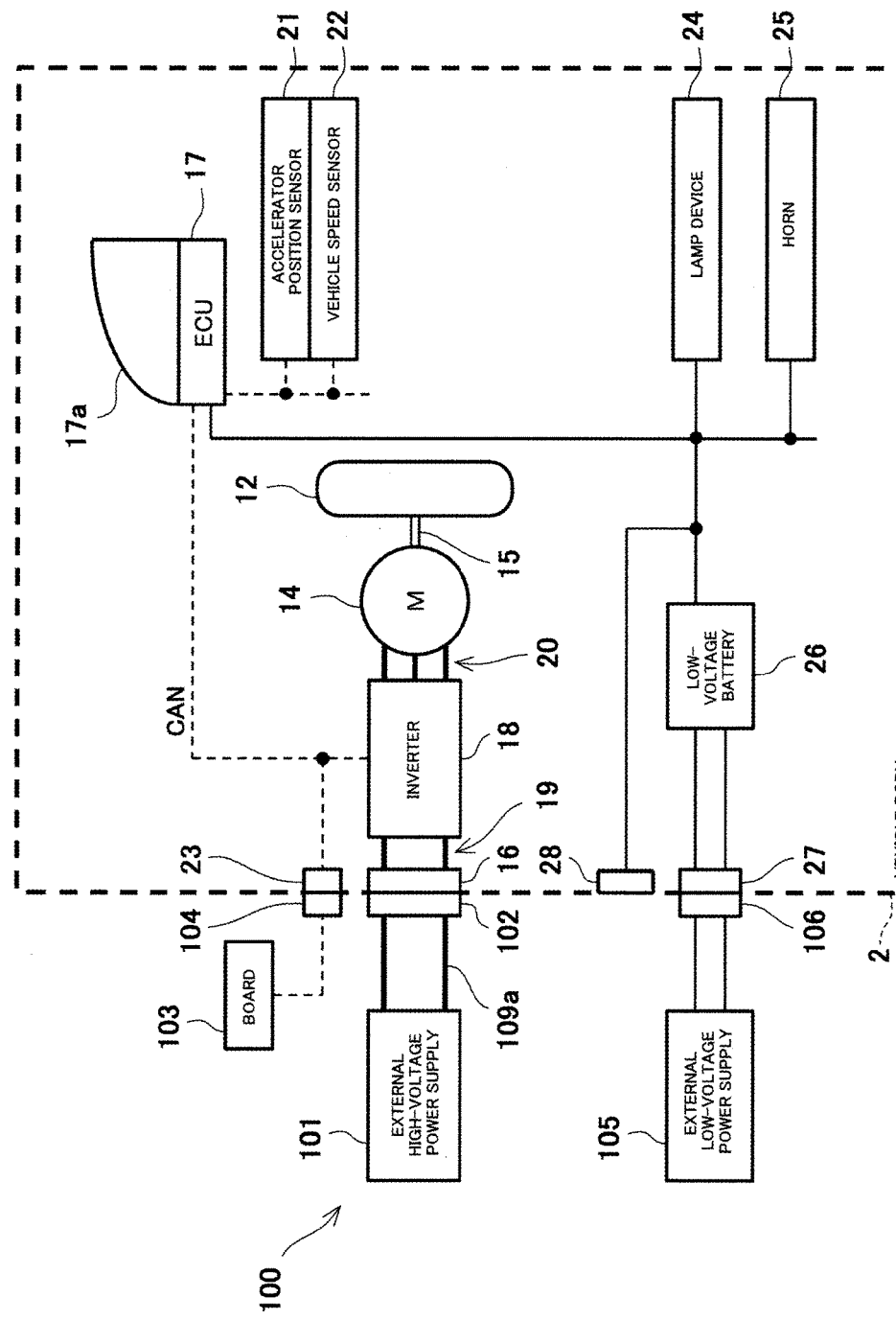
FIG. 4 is a block diagram showing the configuration of the vehicle body of FIG. 2.

Therefore, according to the present embodiment, in a state where the battery pack 3 is removed from the vehicle body 2, a running test of the vehicle body 2 on a test bench can be performed (see FIG. 4). Moreover, even in a state where the battery pack 3 is removed from the vehicle body 2, the battery 62 of the battery pack 3 can be charged by utilizing the in-storage charging connector 64 (see FIG. 5). Therefore, after the vehicle body 2 and the battery pack 3 are manufactured, the vehicle body 2 and the battery pack 3 can be stored in a physically separated manner until the vehicle is delivered to a user in a state where the battery pack 3 is mounted to the vehicle body 2. This makes it possible to facilitate inventory management of the electric motorcycle 1 (in particular, the battery pack 3).

The in-storage charging connector 64 is used for charging the battery 62 during an inventory time, whereas the running-phase power feeding connector 63 is used for supplying electric power from the battery 62 to the electric motor 14 in a state where the battery pack 3 is mounted to the vehicle body 2. The connectors 63 and 64, which are thus prepared for different purposes, are arranged at different positions on the casing 61, respectively. Accordingly, the connector 63 can be disposed suitably for the mounting state of the battery pack 3 on the vehicle body 2, and the connector 64 can be disposed suitably for the storage state of the battery pack 3. For example, the in-storage charging connector 64 can be disposed at a position that is readily accessible when the battery pack 3 is in storage, and the running-phase power feeding connector 63 can be disposed at a position at which the battery pack 3 in a state of being mounted to the vehicle body 2 can be readily connected to the vehicle-body-side power feeding connector 16. This makes it possible to both facilitate the inventory management and improve the efficiency in the work of mounting the battery pack 3 to the vehicle body 2.

Hereinafter, first, the configurations of the vehicle body 2 and the battery pack 3 are described mainly from the electrical point of view, and then these configurations are described mainly from the structural point of view. One example of the aforementioned arrangement of the two connectors 63 and 64 will be described in detail in the structural description below.

Figure 3:
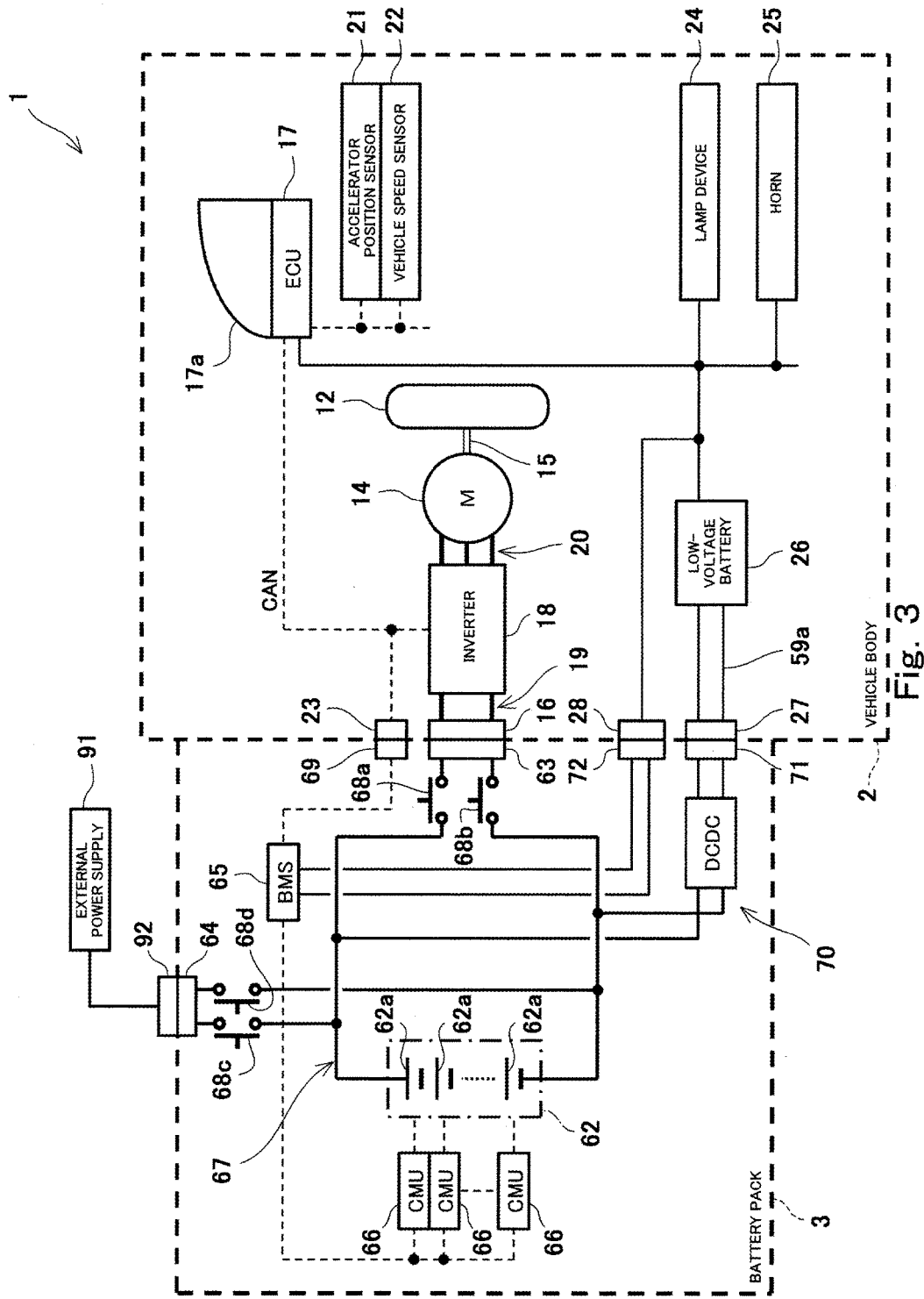
FIG. 3 is a block diagram showing the electrical configuration of the electric motorcycle of FIG. 1.

FIG. 3 is a block diagram showing the configuration of the electric motorcycle 1 of FIG. 1. The block diagram shows a state where the battery pack 3 is mounted to the vehicle body 2. The vehicle body 2 includes the rear wheel 12, the electric motor 14, the power transmission mechanism 15, the vehicle-body-side power feeding connector 16, and the vehicle control unit 17, which have previously been described. The electric motor 14 is an AC motor, whereas the battery 62, which serves as a power supply for the electric motor 14, stores DC power. The vehicle-body-side power feeding connector 16 is supplied with the DC power from the battery 62. The vehicle body 2 includes an inverter 18, which is disposed between the vehicle-body-side power feeding connector 16 and the electric motor 14. The inverter 18 is mechanically and electrically connected to the vehicle-body-side power feeding connector 16 via a live line 19, through which a DC current flows, and also mechanically and electrically connected to the electric motor 14 via a three-phase line 20, through which a three-phase AC current flows. The inverter 18 converts DC power, which is inputted from the vehicle-body-side power feeding connector 16, into AC power. The electric motor 14 is supplied with the AC power from the inverter 18.

For example, the battery 62 includes a portion in which a plurality of battery cells 62a are connected in series. Accordingly, the voltage of the entire battery 62 is a high voltage (e.g., 100 V), which is suitable for driving the electric motor 14. It should be noted that the battery 62 is not limited to the one in which the battery cells 62a are simply connected in series, but may include a portion in which the battery cells 62a are connected in parallel. The battery pack 3 includes the above-described battery monitoring unit 65 and cell-monitoring units 66. The cell-monitoring units 66 correspond to the plurality of battery cells 62a, respectively. All of the cell-monitoring units 66 are accommodated in the casing 61. Each of the cell-monitoring units 66 monitors the temperature and the state of charge of the corresponding one of the battery cells 62a. The battery monitoring unit 65 is communicably connected to the cell-monitoring units 66 by using communication means such as CAN, and monitors the state of the entire battery 62 based on information inputted from the cell-monitoring units 66. For example, based on the information inputted from the cell-monitoring units 66, the battery monitoring unit 65 may estimate the SOC of the entire battery 62, or may perform a determination regarding each battery cell 62a to determine whether or not a malfunction of the battery cell is occurring.

The battery 62 is connected to the running-phase power feeding connector 63 via a battery live line 67, through which a DC current flows. Relays 68a and 68b, configured to open and close the battery live line 67, are provided on the battery live line 67. When the relays 68a and 68b have opened the battery live line 67, electricity can be prevented from flowing to the running-phase power feeding connector 63. The operation of the relays 68a and 68b is controlled by a controller provided in the battery pack 3. In the present embodiment, the battery monitoring unit 65 also serves as the controller controlling the relays 68a and 68b.

The vehicle control unit 17 is communicably connected to an accelerator position sensor 21 and a vehicle speed sensor 22. The accelerator position sensor 21 detects an operation amount of an accelerator grip (not shown) provided on a handlebar. The vehicle speed sensor 22 detects the running speed of the vehicle body 2. The vehicle control unit 17 is communicably connected to the inverter 18 by using communication means such as CAN. The vehicle control unit 17 controls the operation of the inverter 18 based on a grip operation amount inputted from the accelerator position sensor 21, and controls the operation of the electric motor 14 by controlling the inverter 18. For example, if the grip operation amount is great, the inverter 18, i.e., the electric motor 14, is controlled so that the electric motor 14 will generate great motive power for running. It should be noted that the vehicle control unit 17 may control regenerative braking force of the electric motor 14 in accordance with a request from the rider.

The vehicle control unit 17 is also communicably connected to the battery monitoring unit 65. Accordingly, the battery pack 3 includes a pack-side communication connector 69, which is communicably connected to the battery monitoring unit 65. The vehicle body 2 includes a vehicle-body-side communication connector 23, which is communicably connected to the vehicle control unit 17. At the time of mounting the battery pack 3 to the vehicle body 2, these two connectors 23 and 69 are mechanically and electrically connected to each other. As a result, in a state where the battery pack 3 is mounted to the vehicle body 2, bidirectional information transmission is enabled between the vehicle control unit 17 and the battery monitoring unit 65.

The vehicle control unit 17 according to the present embodiment is configured such that a display device 17a for visually presenting vehicle information to the rider is integrated with the vehicle control unit 17. The vehicle control unit 17 with which the display device 17a is integrated is disposed forward of a handlebar 42 (see FIG. 1 and FIG. 2) so that the rider straddling the electric motorcycle 1 while facing forward can easily view the vehicle information. The vehicle information displayed on the display device 17*a* includes, for example, the running speed of the vehicle body 2, the rotation speed of the electric motor 14, and the state of charge of the battery 62. After the vehicle information is collected by the vehicle control unit 17, the vehicle information is supplied to the display device 17*a* for display. By integrating the display device 17*a* with the vehicle control unit 17, communication wiring between the vehicle control unit 17 and the display device 17*a* can be eliminated or reduced significantly. This makes it possible to simplify necessary wire-connecting work in the manufacturing of the vehicle body 2.

In addition to the electric motor 14, a large number of electric components operating at a voltage lower than the battery voltage of the battery 62 are mounted in the electric motorcycle 1. These electric components include the vehicle control unit 17, the display device 17*a*, and the battery monitoring unit 65, which have previously been described, and also include lamp devices 24, such as a headlamp, a brake lamp, and a turn-signal lamp, and a horn 25. The drive voltage of these electric components (e.g., 12 V) is lower than the drive voltage of the electric motor 14 (e.g., 100 V). In the present embodiment, a low-voltage battery 26, the voltage of which is set to be lower than the voltage of the battery 62 included in the battery pack 3, is mounted in the vehicle body 2. The low-voltage battery 26 serves as a power supply for electric components different from the electric motor 14.

The low-voltage battery 26 is electrically connected to a vehicle-body-side input connector 27 provided on the vehicle body 2. The battery pack 3 includes: a step-down circuit 70 connected to the battery 62 via the battery live line 67 and configured to step down the voltage of the battery 62; and a pack-side output connector 71 provided on the casing 61. In the present embodiment, the step-down circuit 70 includes a DC-DC converter accommodated in the casing 61. The pack-side output connector 71 is connectable to the vehicle-body-side input connector 27 in a state where the battery pack 3 is mounted to the vehicle body. Accordingly, the voltage of the electric power stored in the battery 62 can be stepped down to a low voltage by the step-down circuit 68, and the electric power whose voltage has been stepped down can be supplied to the low-voltage battery 26 via the pack-side output connector 71 and the vehicle-body-side input connector 27. In this manner, the electric power stored in the battery 62 can be utilized to charge the low-voltage battery 26.

A vehicle-body-side output connector 28, which is electrically connected to the low-voltage battery 26, is provided on the vehicle body 2 in order to supply the electric power of the low-voltage battery 26 provided in the vehicle body 2 to the electric components (e.g., the battery monitoring unit 65) provided in the battery pack 3. The battery pack 3 includes a battery-input-side connector 72, which is provided on the casing 61 and electrically connected to the electric components (e.g., the battery monitoring unit 65) of the battery pack 3. In a state where the battery pack 3 is mounted to the vehicle body 2, the vehicle-body-side output connector 28 is mechanically and electrically connected to the pack-side input connector 72. Accordingly, the electric power stored in the low-voltage battery 26 can be supplied to the electric components (e.g., the battery monitoring unit 65) of the battery pack 3, and the electric components of the battery pack 3 can operate by using the low-voltage battery 26 mounted in the vehicle body 2 as a power supply for the electric components.

Owing to the above configuration, in a state where the battery pack 3 is mounted to the vehicle body 2, the electric power of the battery 62 in the battery pack 3 can be supplied to the inverter 18 via the running-phase power feeding connector 63 and the vehicle-body-side power feeding connector 16, and the electric power is converted by the inverter 18 into AC power, which can be supplied to the electric motor 14. Also, the electric power of the low-voltage battery 26 mounted in the vehicle body 2 can be supplied to the electric components mounted in the vehicle body 2, such as the vehicle control unit 17 with which the display device 17*a* is integrated, and to the electric components mounted in the battery pack 3, such as the battery monitoring unit 65. This makes it possible to allow the electric motor 14 of the electric motorcycle 1 to operate in accordance with a grip operation amount and the like, and, as shown in FIG. 1, allow the electric motorcycle 1 to run in a self-supporting upright state where the front wheel 11 and the rear wheel 12 are in contact with the ground.

The in-storage charging connector 64 is connected to the battery 62 via the battery live line 67. The in-storage charging connector 64 is connectable to an external charging connector 92, which is connected to the external power supply 91. In a state where the battery pack 3 is mounted to the vehicle body 2, when the in-storage charging connector 64 is connected to the external charging connector 92, the battery 62 can be charged with electric power from the external power supply 91. As described above and below, during a period in which the battery pack 3 is removed from the vehicle body 2 and stored as a stock item, the in-storage charging connector 64 is utilized for charging the battery 62 for maintenance in order to prevent degradation in the quality of the battery 62. According to the electric motorcycle 1 of the present embodiment, even in a state where the battery pack 3 is mounted to the vehicle body 2, the in-storage charging connector 64 can be utilized for charging the battery 62. This makes it possible to reduce the number of connectors, which is advantageous.

On the battery live line 67, in addition to the relays 68*a* and 68*b*, relays 68*c* and 68*d*, configured to open and close the battery live line 67, may be provided. While the relays 68*c* and 68*d* are opening the battery live line 67, the battery 62 can be electrically disconnected from the in-storage charging connector 64 without affecting the electrically connected state between the battery 62 and the running-phase power feeding connector 63. Similar to the relays 68*a* and 68*b*, the operation of the relays 68*c* and 68*d* may be controlled by the battery monitoring unit 65. In this case, preferably, the battery monitoring unit 65 is configured to determine whether or not the in-storage charging connector 64 is being supplied with electric power from the external power supply 91. If it is determined that the in-storage charging connector 64 is being supplied with electric power from the external power supply 91, the battery monitoring unit 65 may control the relays 68*c* and 68*d* such that the relays 68*c* and 68*d* close the battery live line 67. On the other hand, if it is determined that the in-storage charging connector 64 is not currently supplied with electric power from the external power supply 91, the battery monitoring unit 65 may control the relays 68*c* and 68*d* such that the relays 68*c* and 68*d* open the battery live line 67. In this manner, even if a short circuit occurs in the vicinity of the in-storage charging connector 64, an excessive current can be prevented from flowing through the circuit.

FIG. 4 is a block diagram showing the configuration of the vehicle body 2 of FIG. 2. Compared to FIG. 3, the battery pack 3 is omitted from FIG. 4, but instead, FIG. 4 additionally shows one example of a running-use external device 100, which is necessary for allowing the vehicle body 2 to run without the use of the battery pack 3. The running-use external device 100 does not constitute a part of the electric motorcycle 1.

As shown in FIG. 4, the running-use external device 100 includes, for example, the external high-voltage power supply 101 and the external power feeding connector 102 electrically connected to the power supply 101. The running-use external device 100 may include a dummy signal output board 103 and a dummy signal output connector 104 communicably connected to the output board 103. The running-use external device 100 may further include an external low-voltage power supply 105 and an external output connector 106 electrically connected to the power supply 105.

Similar to the battery 62 (see FIG. 3 and FIG. 5), the external high-voltage power supply 101 is a DC power supply, the voltage of which is suitable for driving the electric motor 14. The external power feeding connector 102 has the same structure as that of the running-phase power feeding connector 63 (see FIG. 3 and FIG. 5) of the battery pack 3 (see FIG. 3 and FIG. 5), and is electrically and mechanically connectable to the vehicle-body-side power feeding connector 16. Since the external high-voltage power supply 101 is mechanically and electrically connected to the external power feeding connector 102 via a wire harness 109a, the external high-voltage power supply 101 can be positioned physically away from the vehicle body 2. Therefore, the external high-voltage power supply 101 will not physically interfere with the vehicle body 2 at the time of performing a running test of the vehicle body 2 on a test bench.

The dummy signal output board 103 is configured to output information, which is the same as the information that the battery monitoring unit 65 (see FIG. 3 and FIG. 5) included in the battery pack 3 (see FIG. 3 and FIG. 5) supplies to the vehicle control unit 17, or to inform the vehicle control unit 17 of a "bench testing mode". The dummy signal output connector 104 has the same structure as that of the pack-side communication connector 69 (see FIG. 3 and FIG. 5) of the battery pack 3, and is electrically and mechanically connected to the vehicle-body-side communication connector 23. Accordingly, information generated by the dummy signal output board 103 can be supplied to the vehicle control unit 17 via the dummy signal output connector 104 and the vehicle-body-side communication connector 23.

As previously described, the battery monitoring unit 65 supplies information about the state of the battery 62 to the vehicle control unit 17. The vehicle control unit 17 uses the information from the battery monitoring unit 65 to control the inverter 18 (i.e., the electric motor 14), and displays the information from the battery monitoring unit 65 on the display device 17a. The dummy signal output board 103 is configured to generate dummy signals indicative of the same contents as those of the information outputted from the battery monitoring unit 65, and to output the dummy signals to the vehicle control unit 17 when the connectors 23 and 104 are connected. Accordingly, at the time of performing a running test of the vehicle body 2 on a test bench without the battery pack 3, it is possible to check whether or not the vehicle control unit 17 performs controls properly in accordance with changes in the state of the battery 62, and it is possible to check whether or not controlled objects operate properly in accordance with results of the controls by the vehicle control unit 17.

As described above, according to the electric motorcycle 1 of the present embodiment, the use of the running-use external device 100 allows the vehicle body 2 to run even without the battery pack 3. Accordingly, a running test of the vehicle body 2 on a test bench can be performed without the battery pack 3. Therefore, after the manufacturing of the vehicle body 2 is completed in a vehicle factory, the running test on the test bench can be performed before mounting the battery pack 3 to the vehicle body 2. Even in a case where the tested vehicle body 2 does not pass the test regarding some test items, the vehicle body 2 can be tested without wastefully mounting the battery pack 3 to the vehicle body 2, which is advantageous.

The dummy output control board 103 may be configured to transmit operation signals to the external high-voltage power supply and the external low-voltage power supply. This makes it possible to test and confirm the operation of the vehicle body in a state where the battery voltage of each of the batteries 62 and 26 has decreased (e.g., whether or not information indicating that the battery voltage has decreased is properly displayed on the display device 17a). Thus, the configuration of the dummy signal output board is not limited to the configuration that only outputs dummy signals indicative of exactly the same contents as those of the information outputted from the battery monitoring unit 65, but the dummy signal output board may be configured to output signals specifically relating to the running test on the test bench.

Figure 5:
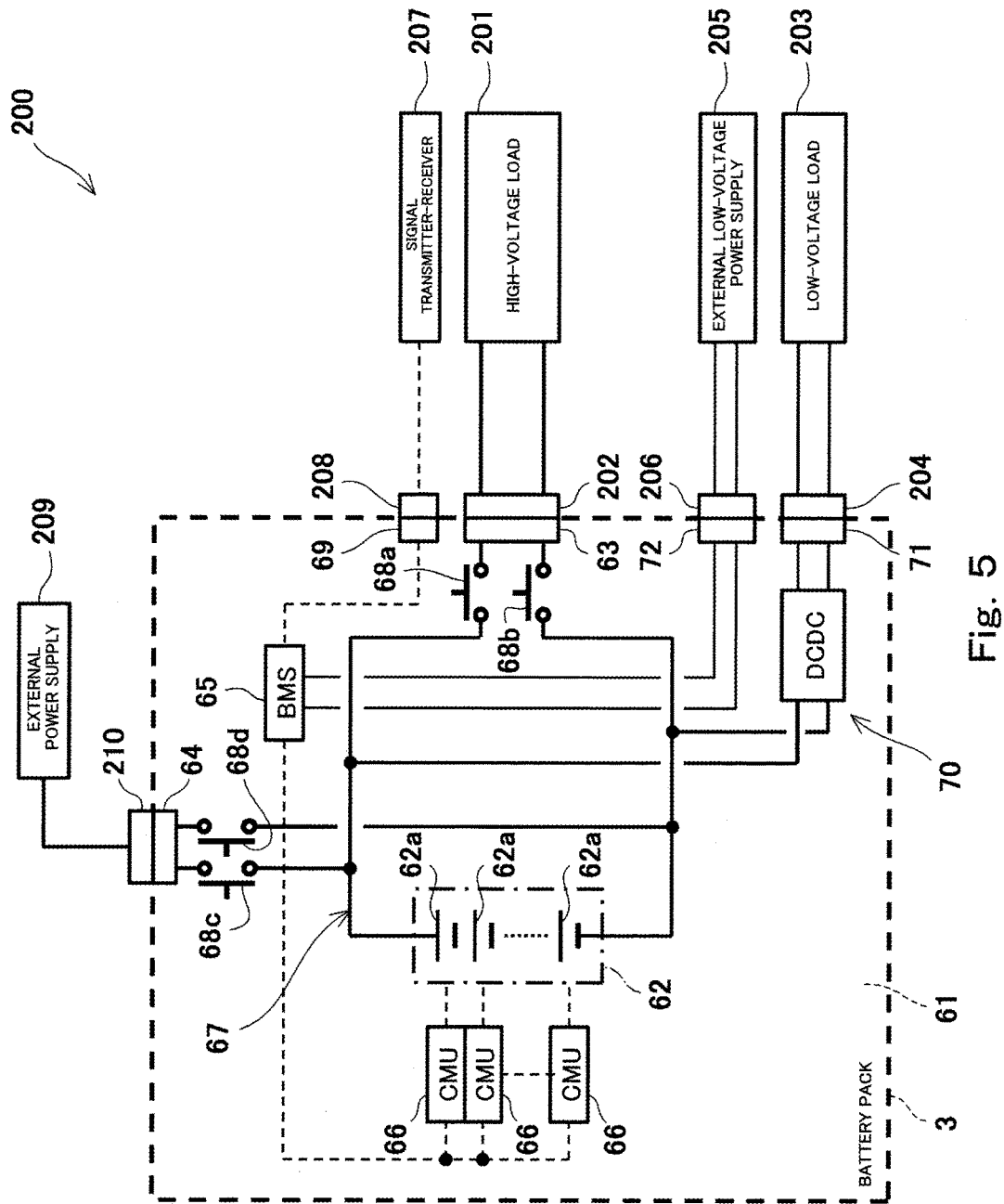
FIG. 5 is a block diagram showing the configuration of the battery pack of FIG. 2.

FIG. 5 is a block diagram showing the configuration of the battery pack 3 of FIG. 2. Compared to FIG. 3, the vehicle body 2 is omitted from FIG. 5, but instead, FIG. 5 additionally shows one example of a battery-use external device 200, which is necessary for storing the battery pack 3 as a stock item independently of the vehicle body 2. The battery-use external device 200 does not constitute a part of the electric motorcycle 1.

As shown in FIG. 5, the battery-use external device 200 includes, for example, a high-voltage load 201, an external high-voltage input connector 202 connected to the high-voltage load 201, a low-voltage load 203, an external low-voltage input connector 204 connected to the low-voltage load 203, an external low-voltage power supply 205, an external output connector 206 connected to the external low-voltage power supply 205, a signal transmitter-receiver 207, an external communication connector 208 communicably connected to the signal transmitter-receiver 207, an external power supply 209, and an external charging connector 210 connected to the external power supply 209.

The high-voltage load 201 is an electrical load equivalent to the electric motor 14. The external high-voltage input connector 202 has the same structure as that of the vehicle-body-side power feeding connector 16 (see FIG. 3 and FIG. 4), and is connectable to the running-phase power feeding connector 63. By connecting the external high-voltage input connector 202 to the running-phase power feeding connector 63, the battery 62 can be made to discharge electric power, and the electric power can be consumed at high voltage. The signal transmitter-receiver 207 is configured to output information that is the same as information supplied from the vehicle control unit 17, and to receive input signals from the battery monitoring unit 65. The external communication connector 208 has the same configuration as that of the vehicle-body-side communication connector 23 (see FIG. 3 and FIG. 4), and is connectable to the pack-side communication connector 69. Accordingly, information generated by the signal transmitter-receiver 207 can be supplied to the battery monitoring unit 65 via the external communication connector 208 and the pack-side communication connector 69. Also, information generated by the battery monitoring unit 65 can be supplied to the vehicle control unit 17.

The drive voltage of the low-voltage load 203 is equivalent to the battery voltage of the low-voltage battery 26 (see FIG. 3 and FIG. 4). The external low-voltage input connector 204 has the same structure as that of the vehicle-body-side input connector 27 (see FIG. 3 and FIG. 4), and is connectable to the pack-side output connector 71. By connecting the external low-voltage input connector 204 to the pack-side output connector 71, low voltage power from the step-down circuit 70 can be consumed by the low-voltage load 203. The voltage of the external low-voltage power supply 205 is equivalent to the voltage of the low-voltage battery 26 (see FIG. 3 and FIG. 4). The external power feeding connector 102 has the same structure as that of the vehicle-body-side output connector 28 (see FIG. 3 and FIG. 4), and is electrically and mechanically connectable to the pack-side input connector 72. By connecting the external power feeding connector to the pack-side input connector 72, the electric components in the battery pack 3 (particularly the battery monitoring unit 65) can be operated by using electric power from the external low-voltage power supply.

The external power supply 209 is a high-voltage power supply suitable for charging the battery 62. In a case where the external power supply 209 is an AC power supply, a converter for AC-DC conversion may be provided between the external power supply 209 and the external charging connector 210, or may be included in the external power supply 209 or in the external charging connector 210. The external charging connector 210 is connectable to the in-storage charging connector 64. By connecting the external charging connector 210 to the in-storage charging connector 64, the battery 62 can be charged with electric power from the external power supply 209.

As described above, the battery pack 3 according to the present embodiment is such that, even in a state where the battery pack 3 is removed from the vehicle body 2, a charging test of the battery 62, a discharging test of the battery 62, an operation check of the step-down circuit 70, and an operation check of the battery monitoring unit 65 can be performed by using the battery-use external device 200. Therefore, as previously mentioned, a running test of the vehicle body 2 on a test bench can be performed independently of the battery pack 3, and also, the battery pack 3 can be tested independently of the vehicle body 2.

The battery pack 3 includes the in-storage charging connector 64 for charging the battery 62. By connecting the external charging connector 210 to the in-storage charging connector 64, the battery 62 can be charged even in a state where the battery pack 3 is removed from the vehicle body 2. Accordingly, during a period over which the battery pack 3 is stored as a stock item separately from the vehicle body 2, the battery pack 3 can be charged for maintenance. This makes it possible to store the battery pack 3 alone while preventing degradation of the battery 62. Since the battery pack 3 can be stored alone, a running test of the vehicle body 2 on a test bench can be performed with no battery pack 3 amounted to the vehicle body 2, and also, the vehicle body 2 can be stored as a stock item independently of the battery pack 3 after the running test on the test bench is performed.

Since the battery pack 3 can be stored alone, the work of charging the battery pack 3 for maintenance is neither complex nor cumbersome, which is advantageous. While the battery pack 3 is in storage, temperature control of the battery pack 3 is also important. In this respect, even if the electric motorcycle 1 needs to pass through a low-latitude region when the electric motorcycle 1 is transported by sea, strict temperature control is necessary only for the battery pack 3, which is removed from the vehicle body 2.

Next, the structures of the vehicle body 2 and the battery pack 3 are described. Returning to FIG. 1 and FIG. 2, the vehicle body 2 includes a vehicle body frame 30 for supporting components and devices constituting the vehicle body 2, such as the electric motor 14. The vehicle body frame 30 mainly includes a head tube 31 and a main frame 32. The head tube 31 or the main frame 32 is directly or indirectly connected to a front bracket 33, a pivot bracket 34, a battery bracket 35, a seat frame 36, a seat strut 37, and the like. It should be noted that these components may be seen as components constituting a part of the vehicle body frame 30, or may be seen as components mounted to the vehicle body frame 30.

The head tube 31 forms the front end of the vehicle body frame 30, and a steering shaft 41 of a steering device 40 is inserted in the head tube 31. The handlebar 42, which includes a pair of right and left grips, is connected to the upper end of the steering shaft 41. It should be noted that the aforementioned accelerator grip is the right-side grip of the pair of right and left grips. When a rider holding the right and left grips turns the handlebar 42, the steering shaft 41 rotates about the axis of the head tube 31 (or the axis of the steering shaft 41 disposed coaxially with the head tube 31). It should be noted that, in the description below, the rotational axis of the handlebar 42 is referred to as a "steering rotational axis A". The handlebar 42 turns about the steering rotational axis A. The steering rotational axis A according to the present embodiment is specifically the axis of the steering shaft 41 (or the axis of the head tube 31 disposed coaxially with the steering shaft 41).

The steering device 40 of the electric motorcycle 1 according to the present embodiment includes no front fork, and adopts a so-called link-type structure. For shock-absorbing functions of the steering device 40, the vehicle body 2 includes a front swing arm 43 extending forward from the vehicle body frame 30 (more specifically, extending from a front portion 45 of the main frame 32). The axle of the front wheel 11 is rotatably supported by the front end of the front swing arm 43. It should be noted that the front swing arm 43 may be provided on either one of right or left side, or may be provided on both right and left sides. The axle may be rotatably supported by a link member. In such a case, the front end of the front swing arm 43 is connected to the link member, and supports the front wheel 11 via the link member. For steering functions of the steering device 40, the front end of the front swing arm 43 (or if there is a link member, the link member connected to the front end of the front swing arm 43) supports the front wheel 11 in such a manner as to allow the front wheel 11 to make angular displacement to the right and to the left (i.e., such that the front wheel 11 can be steered). The lower end of the steering shaft 41 is connected to the front wheel 11 via a pair of right and left steering links 44. When the steering shaft 41 rotates, the right and left steering links 44 operate in accordance with the rotation direction of the steering shaft 41. As a result, the front wheel 11 makes angular displacement to the right or to the left in accordance with the rotation direction of the steering shaft 41 within an angular displacement range allowed by the front swing arm 43. That is, the front wheel 11 turns in accordance with a request from the rider. It should be noted that the steering links 44 may be arranged, as shown in FIG. 1, to extend rearward from the lower end of the steering shaft 41 and then extend forward from the vehicle body frame 30, or may be arranged to extend substantially downward from the lower end of the steering shaft 41 toward the front wheel 11.

Since the steering device 40 according to the present embodiment includes no front fork, the steering rotational axis A can be readily disposed non-parallel to a caster axis B. The steering rotational axis A is inclined rearward relative to a vertical line. Accordingly, the higher the elevation from an intersection point C of the steering rotational axis A with the caster axis B is, the more forward the steering rotational axis A is from the caster axis B. In other words, an angle formed by the vertical line and the steering rotational axis A is less than an angle (caster angle) formed by the vertical line and the caster axis B, and the steering rotational axis A is a more upward axis than the caster axis B. As described in detail below, since the steering device 40 has the above-described configuration, the size of the battery pack 3 can be made large in the forward and rearward direction, and also, the battery pack 3 can be made readily mountable and removable.

The front bracket 33 protrudes forward from the head tube 31. The above-described vehicle control unit 17 with which the display device 17a is integrated is mounted to the front bracket 33. A headlamp unit, a front cowl, and a windshield may be mounted to the front bracket 33 although they are not shown in detail.

The main frame 32 includes: the front portion 45, which extends from the head tube 31 downward and slightly rearward; and a lower portion 46, which horizontally extends rearward from the lower end of the front portion 56. The front portion 45 is formed as a pair of right and left front portions, and also, the lower portion 46 is formed as a pair of right and left lower portions. The front portion 45 is provided with a radiator 47 for radiating heat from a coolant for cooling down the inverter 18 and the electric motor 14. Since the present embodiment includes no front fork, ram air toward the radiator 47 disposed rearward of the front wheel 11 is blown onto the radiator 47 without being blocked by a front fork, and thereby high water-cooling efficiency is realized.

The lower end of the pivot bracket 34 is connected to the rear end of the lower portion 46. The pivot bracket 34 extends upward from the rear end of the lower portion 46. The front end of a rear swing arm 48 is connected to the pivot bracket 34 such that the front end of the rear swing arm 48 is swingable about a pivot shaft. The rear wheel 12 is rotatably supported by the rear end of the rear swing arm 48. The seat frame 36 extends rearward from the battery bracket 35. A seat 49, on which the rider is seated, is installed on the top of the seat frame 36.

The electric motor 14 is accommodated in a motor case. According to the present embodiment, the motor case is formed as a unit together with a transmission case and an oil pan. The transmission case accommodates the transmission 15a. The oil pan stores oil for use in cooling and/or lubrication. The motor case according to the present embodiment forms a motor unit case 50 together with the transmission case and the oil pan. The motor unit case 50 is supported by the rear of the main frame 32. Specifically, the motor unit case 50 is fastened to the rear end of the lower portion 46 by bolts, and also, fastened to the front of the pivot bracket 34 by bolts. Since the electric motor 14 is supported by the rear of the main frame 32, the electric motor 14 can be disposed as close as possible to the rear wheel 12, and thereby the power transmission mechanism 15 from the electric motor 14 to the rear wheel 12 is made compact.

The pack accommodating space 13, which is formed in the above-described vehicle body 2, is surrounded by the vehicle body frame 30 (e.g., the head tube 31, the main frame 32 (the front portion 45 and the lower portion 46), and the pivot bracket 34) and the motor unit case 50. The pack accommodating space 13 is open at the top. The head tube 31 and the front portion 45 serve as members that define the front edge of the pack accommodating space 13. The motor unit case 50 is provided on the rear end of the lower portion 46 and on the front of the pivot bracket 34. Accordingly, the motor unit case 50 serves together with the lower portion 46 to define the bottom edges of the pack accommodating space 13, and serves together with the pivot bracket 34 to define the rear edges of the pack accommodating space 13.

The pack accommodating space 13 according to the present embodiment is open at the top. Therefore, the battery pack 3 can be brought downward into the pack accommodating space 13 to be accommodated therein, and can be removed upward from the pack accommodating space 13. In the present embodiment, an area that includes the pack accommodating space 13 and a space above the pack accommodating space 13 is formed such that in this area, the dimension in the forward and rearward direction increases along an upward direction. It should be noted that the space above the pack accommodating space 13 is positioned above a part of the pack accommodating space 13, the part being occupied by the battery pack 3 in a state where the battery pack 3 is mounted to the vehicle body 2. When mounting or removing the battery pack 3, the battery pack 3 passes through the space above the pack accommodating space 13. Since the area that includes the pack accommodating space 13 and the space above the pack accommodating space 13 is formed as described above, by vertically moving the battery pack 3 relative to the vehicle body 2, the battery pack 3 can be inserted into or removed from the pack accommodating space 13 without interfering with the vehicle body 2 while the seat 49 is left attached to the vehicle body 2.

As one example, in the present embodiment, the area is formed in such a manner that at least the upper part of the front portion 45 of the main frame 32 is inclined rearward as extending downward from the head tube 31. As previously described, in the present embodiment, the higher the elevation from the intersection point C of the steering rotational axis A with the caster axis B is, the more forward the steering rotational axis A is from the caster axis B. Accordingly, the handlebar 42 according to the present embodiment is disposed more forward compared to a case where the handlebar of the steering device includes a front fork, in which case the handlebar is disposed on an extension of the caster axis. As a result, the space above the pack accommodating space can be formed widely at the forward side, and thereby a probability that the pack accommodating space 13 is obscured by the handlebar 42 when seen in plan view can be reduced. This makes it possible to mount and remove the battery pack 3 to and from the vehicle body 2 by vertically moving the battery pack 3, and also increase the size of the battery pack 3 in the forward and rearward direction.

The bottom of the battery pack 3 is placed on the lower portion 46 of the main frame 32. The lower portion 46 is formed as a pair of lower portions arranged in the vehicle width direction. The lower portion 46 extends substantially horizontally in the forward and rearward direction when the vehicle body 2 is in a self-supporting upright state where the front wheel 11 and the rear wheel 12 are in contact with the ground. Accordingly, the battery pack 3 can be stably supported by the main frame 32. A notch is formed in the lower rear part of the battery pack 3 in order to avoid interference with the motor unit case 50. In other words, as a result of forming such a notch 80 in the battery pack 3, the upper part of the battery pack 3 is provided with a rearward protruding portion 81, which protrudes rearward, and the front part of the battery pack 3 is provided with a downward protruding portion 82, which protrudes downward. The downward protruding portion 82 of the battery pack 3 is placed on the lower portion 46. The rearward protruding portion 81 is disposed above the motor unit case 50.

The rear surface of the rearward protruding portion 81 is in proximity to the battery bracket 35 in the forward and rearward direction. The battery bracket 35 includes rear fixing portions 51 for fixing the rear part of the battery pack 3. Each of the rear fixing portions 51 is formed as a pair of rear fixing portions arranged in the vehicle width direction. Each of the rear fixing portions 51 protrudes rearward from the battery bracket 35. In a state where the battery pack 3 is mounted to the vehicle body 2, the rearward protruding portion 81 of the battery pack 3 is sandwiched between the rear fixing portions 51. Accordingly, at the time of mounting the battery pack 3 to the vehicle body 2, the positioning of the rear and upper part of the battery pack 3 relative to the vehicle body 2 in the vehicle width direction can be performed. Fixing members such as bolts are inserted through the rear fixing portions 51 from the outside in the vehicle width direction, and the fixing members are inserted in rear fixing member inserted portions 83 formed in the rearward protruding portion 81. In this manner, the rear and upper part of the battery pack 3 can be fixed to the vehicle body 2.

The lower portion 46 of the main frame 32 is provided with lower fixing portions 52. Each of the lower fixing portions 52 is formed as a pair of lower fixing portions arranged in the vehicle width direction. Each of the lower fixing portions 52 protrudes upward from the lower portion 46. The lower fixing portions 52 are arranged forward of the motor unit case 50. In a state where the battery pack 3 is mounted to the vehicle body 2, the downward protruding portion 82 of the battery pack 3 is sandwiched between the lower fixing portions 52. Accordingly, at the time of mounting the battery pack 3 to the vehicle body 2, the positioning of the front and lower part of the battery pack 3 relative to the vehicle body 2 in the vehicle width direction can be performed. Fixing members such as bolts are inserted through the lower fixing portions 52 from the outside in the vehicle width direction, and the fixing members are inserted in lower fixing member inserted portions 84 formed in the downward protruding portion 82. In this manner, the front and lower part of the battery pack 3 can be fixed to the vehicle body 2.

As described above, in the electric motorcycle 1 according to the present embodiment, the battery pack 3 can be stably supported by utilizing the lower portion 46 of the main frame 32. In this manner, the vertical position of the battery pack 3 relative to the vehicle body 2 is stabilized. The positioning of the battery pack 3 in the vehicle width direction can be performed by utilizing the rear fixing portions 51 and the lower fixing portions 52. Also, the positioning of the battery pack 3 in the forward and rearward direction can be performed by utilizing fixing members such as bolts, and thereby the battery pack 3 can be firmly fixed to the vehicle body 2.

When the battery pack 3 is thus positioned relative to the vehicle body 2 and fixed to the vehicle body 2, the lower surface of the rearward protruding portion 81 faces the upper part of the motor unit case 50 in the vertical direction, and the rear surface of the rearward protruding portion 81 faces the inverter 18 in the forward and rearward direction, the inverter 18 being disposed in the space below the seat frame 36.

The pack-side output connector 71 is provided on the lower surface of the rearward protruding portion 81, whereas the vehicle-body-side input connector 27 to be connected to the pack-side output connector 71 is provided above the motor unit case 50. The running-phase power feeding connector 63 is provided on the rear surface of the rearward protruding portion 81, whereas the vehicle-body-side power feeding connector 16 to be connected to the running-phase power feeding connector 63 is provided at the front of the casing of the inverter 18. The in-storage charging connector 64 is provided on the top of the battery pack 3. In this manner, the in-storage charging connector 64 is provided at a different position (more specifically, on a different surface) from that of the running-phase power feeding connector 16.

Figure 6:
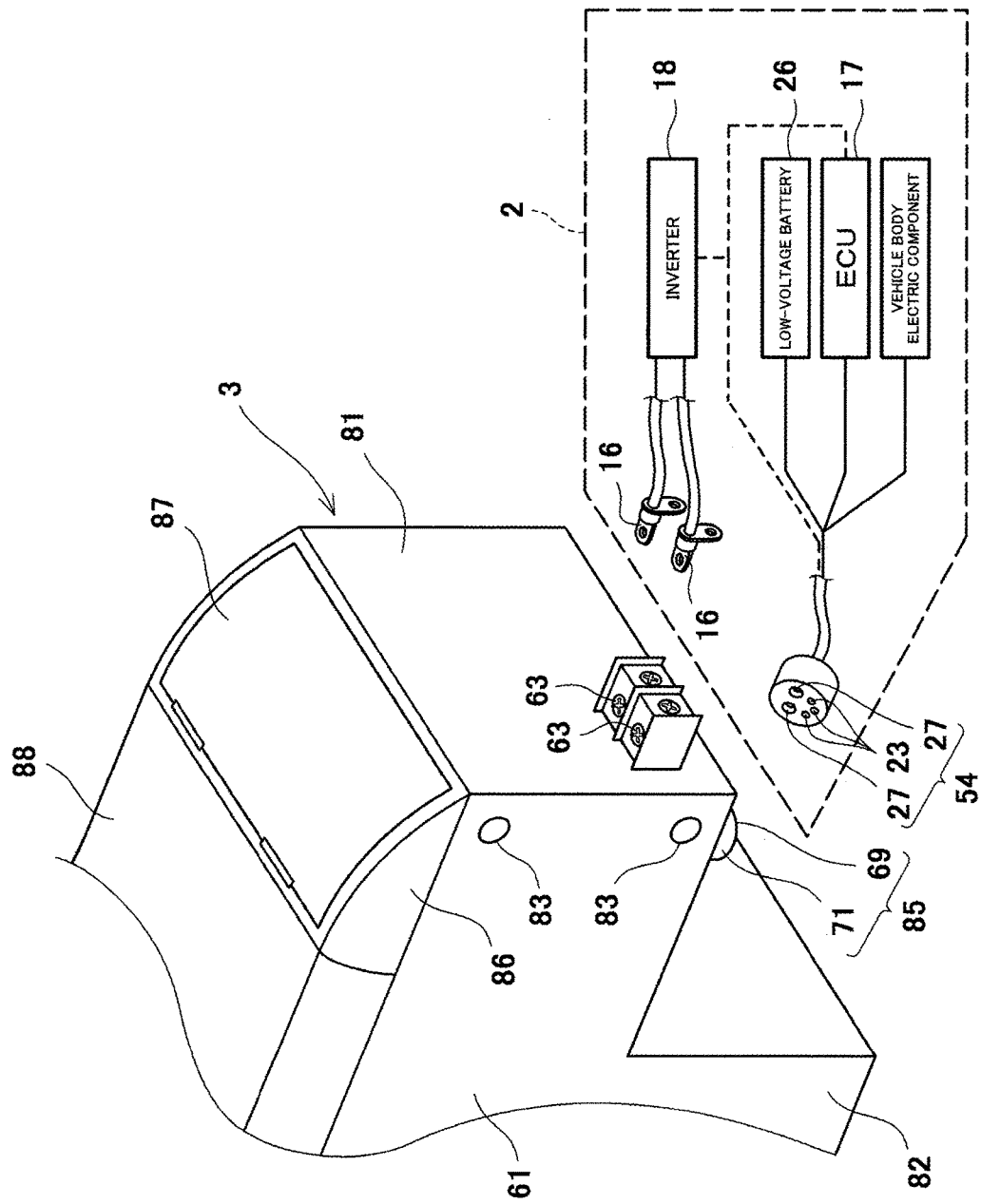
FIG. 6 is a conceptual diagram schematically showing a running-phase power feeding connector, a pack-side output connector, a vehicle-body-side power feeding connector, and a vehicle-body-side input connector by means of a rear perspective view of the battery pack.

FIG. 6 is a conceptual diagram schematically showing the running-phase power feeding connector 63, the pack-side output connector 71, the vehicle-body-side power feeding connector 16, and the vehicle-body-side input connector 27 by means of a rear perspective view of the battery pack 3. As shown in FIG. 1, FIG. 2, and FIG. 6, in a state where the battery pack 3 is mounted to the vehicle body 2, the pack-side output connector 71 is disposed in proximity to the vehicle-body-side input connector 27. In the present embodiment, the vehicle-body-side input connector 27 is connected to a body side thereof via a flexible cable 53a. The body side of the vehicle-body-side input connector 27 means a component of the vehicle body 2. In the present embodiment, the component is the motor unit case 50. Since the vehicle-body-side input connector 27 is connected to the component of the vehicle body 2 (the motor unit case 50 as one example) via the cable 53a, even if the battery pack 3 is mounted to the vehicle body 2 with a mounting precision that is not particularly high, the work of connecting the pack-side output connector 71 to the vehicle-body-side input connector 27 can be readily performed. It should be noted that, in addition to or instead of the vehicle-body-side input connector 27, the pack-side output connector 71 may be provided with the cable 53a. In this case, the pack-side output connector 71 is connected to a body side thereof via the cable, i.e., connected to a component of the battery pack 3 (e.g., the casing 61).

In a state where the battery pack 3 is mounted to the vehicle body 2, the running-phase power feeding connector 63 is disposed in proximity to the vehicle-body-side power feeding connector 16. In addition, in the present embodiment, the vehicle-body-side power feeding connector 16 is connected to a body side thereof via a flexible cable 53b, i.e., connected to a component of the vehicle body 2. In the present embodiment, the vehicle-body-side power feeding connector 16 is connected to the casing of the inverter 18 via the cable 53b. Therefore, the aforementioned functional advantage exerted in the relationship between the pack-side output connector 71 and the vehicle-body-side input connector 27 is similarly exerted in the relationship between the running-phase power feeding connector 63 and the vehicle-body-side power feeding connector 16. In addition to or instead of the vehicle-body-side power feeding connector 16, the running-phase power feeding connector 63 may be provided with the cable 53b. In this case, the running-phase power feeding connector 63 is connected to a body side thereof via the cable, i.e., connected to a component of the battery pack 3 (e.g., the casing 61). As shown in FIG. 6, in the present embodiment, the running-phase power feeding connector 63 serves as a terminal block, and the vehiclebody-side power feeding connector 16 serves as a terminal connected to the terminal block. Thus, the definition of the term "connector" is not limited to a male or female retractable plug, but includes a structure (e.g., a terminal block) that allows two wirings to be electrically connected to each other with use of a tool such as a screwdriver.

It should be noted that, as shown in FIG. 6, a pack-side integrated connector 85 may be formed by combining the pack-side output connector 71 with the pack-side communication connector 69, and a vehicle-body-side integrated connector 54 may be formed by combining the vehicle-body-side input connector 27 with the vehicle-body-side communication connector 23. This makes it possible to perform connection or disconnection of two wirings having different functions from each other by performing connector attaching work or connector detaching work just once.

As shown in FIG. 1 and FIG. 2, the pack accommodating space 13 is open at the top. In a state where the battery pack 3 is positioned relative to the vehicle body 2 and fixed to the vehicle body 2, the upper part of the battery pack 3 is exposed in the space above the pack accommodating space 13. As mentioned above, the in-storage charging connector 64 is disposed at a position different from that of the running-phase power feeding connector 63. In the present embodiment, the in-storage charging connector 64 is provided on the top of the battery pack 3. A connector accommodating portion 86 surrounding the in-storage charging connector 64 is provided on the top of the casing 61. The top wall of the connector accommodating portion 86 is formed as an openable and closeable cover 87. When the cover 87 is in an opened position, the connector accommodating portion 86 is open and the in-storage charging connector 64 is exposed in the space above the pack accommodating space 13.

In a state where the battery pack 3 is removed from the vehicle body 2, the in-storage charging connector 64 is used for charging the battery 62 for maintenance. Also in a state where the battery pack 3 is mounted to the vehicle body 2, the in-storage charging connector 64 is used for charging the battery 62. In the present embodiment, while the battery pack 3 is in storage, the downward protruding portion is placed on the floor similar to the manner of mounting the battery pack 3 to the vehicle body 2. Therefore, by inserting the external charging connector 210 (see FIG. 5) into the connector accommodating portion 86 from above and connecting the external charging connector 210 to the in-storage charging connector 64, the charging for maintenance can be performed. While the battery pack 3 is in storage, the lower rear end of the rearward protruding portion 81 and the lower rear end of the downward protruding portion may be brought into contact with the ground. In this manner, the connector accommodating portion 86 may be made to face rearward, and as a result, the necessity of lifting up the external charging connector 210 is reduced, which makes it possible to perform the charging work more easily. Even in a state where the battery pack 3 is mounted to the vehicle body 2, by inserting the external charging connector 92 (see FIG. 3) into the connector accommodating portion 86 from above through the space above the pack accommodating space 13 and connecting the external charging connector 92 to the in-storage charging connector 64, the battery 62 can be charged.

The battery pack 3 is formed such that, when removed from the vehicle body 2, the battery pack can be kept in a storage site in a self-standing manner. Preferably, the in-storage charging connector 64 and the running-phase power feeding connector 63 are arranged such that each of these connectors is positioned at a higher elevation than a casing-placement surface of the casing 61, which is a surface to be placed on the storage site. It is particularly preferable that the in-storage charging connector 64 be positioned at a higher elevation than the vertically central position of the casing 61. By adopting such connector arrangement, the work of charging the battery pack 3 when the battery pack 3 is in storage becomes easier, and also, even if the floor of the storage site becomes flooded due to rainwater or the like, the in-storage charging connector 64 can be protected from the water. Preferably, the running-phase power feeding connector 63 is formed on a surface of the casing 61, the surface facing the inverter 18 of the vehicle body 2 in a state where the battery pack 3 is mounted to the vehicle body 2 (in the present embodiment, the rear surface of the casing 61). In this manner, wiring from the battery 62 to the inverter 18 can be made short. Also in a state where the battery pack 3 is mounted to the vehicle body 2, the in-storage charging connector 64 is utilized as a connector for charging the battery 62. Since the in-storage charging connector 64 is covered by the openable and closeable cover 87, even after the product is delivered to the user, the in-storage charging connector 64, which is provided at a relatively upper position on the battery pack 3, can be protected from rainwater. Assume a case where the battery monitoring unit 65 is configured to control the relays 68a and 68b such that the relays 68a and 68b keep the battery live line 67 open until the preparation for starting driving the electric motor 14 is completed. In this case, the running-phase power feeding connector 63 may be exposed from the casing 61.

As described above, the battery pack 3 according to the present embodiment is configured such that the running-phase power feeding connector 63 and the in-storage charging connector 64 are arranged at different positions (more specifically, on different surfaces) of the casing, respectively. Accordingly, the in-storage charging connector 64 can be disposed at a position that is readily accessible at least when the battery pack 3 is in storage, and the running-phase power feeding connector 63 can be disposed at a position at which the running-phase power feeding connector 63 can be readily connected to the vehicle-body-side power feeding connector.

The connector accommodating portion 86 protrudes upward from the rearward protruding portion 81. The length of the upward protrusion of the connector accommodating portion 86 decreases toward the rear. This makes it possible to reduce pressure that is applied onto the abdomen of the rider from the connector accommodating portion 86 when the rider seated on the seat 49, which is disposed rearward of the rearward protruding portion 81, holds the handlebar 42. A decorative member 88, which is positioned forward of the connector accommodating portion 86 and which is continuous with the connector accommodating portion 86, is provided on the top of the battery pack 3. The top surface of the decorative member 88 is smoothly continuous with the connector accommodating portion 86, and with such a structural feature, the external appearance of the electric motorcycle 1 can be improved. Without such a decorative member, there is a risk that the upper front edge of the connector accommodating portion 86 presses on the chest of the rider when the rider leans forward. The installation of the decorative member 88 prevents such a risk.

Although the embodiment of the present invention has been described above, modifications, additions, and deletions can be suitably made to the above-described configurations without departing from the scope of the present invention. For example, although the above embodiment describes a structure in which the inverter 18 is disposed outside the battery pack 3, the inverter 18 may alternatively be included in the battery pack 3. In this case, the running-phase power feeding connector outputs a current that has been converted by the inverter 18 into an AC current. The low-voltage battery 26 may also be included in the battery pack 3. The above embodiment illustratively shows an electric motorcycle as an embodiment of the electric vehicle. However, the above embodiment may be applied to other types of saddle-riding electric vehicles, and also, applicable not only to saddle-riding electric vehicles but to other electric vehicles.

INDUSTRIAL APPLICABILITY

The present invention provides a functional advantage of making it possible to facilitate inventory management of electric vehicles, and is useful when applied to electric motorcycles as well as other electric vehicles.

REFERENCE CHARACTER LIST

1 electric motorcycle (electric vehicle)
2 vehicle body
3 battery pack
11 front wheel (wheel)
12 rear wheel (wheel)
13 pack accommodating space
14 electric motor
16 vehicle-body-side power feeding connector
17 vehicle control unit
24 lamp device (vehicle-body-side electric component)
25 horn (vehicle-body-side electric component)
27 vehicle-body-side input connector
28 vehicle-body-side output connector
30 vehicle body frame
42 handlebar
43 front swing arm (front wheel supporting arm)
59*a*, 59*b* cable
61 casing
62 battery
63 running-phase power feeding connector
64 in-storage charging connector
65 battery monitoring unit (pack-side electric component)
70 step-down circuit
71 pack-side output connector
72 pack-side input connector

The invention claimed is:

1. An electric vehicle comprising:
a vehicle body including a wheel and an electric motor configured to drive rotation of the wheel; and
a battery pack mounted to the vehicle body, wherein
the vehicle body includes:
   a vehicle-body-side power feeding connector configured to supply electric power to the electric motor; and
   a vehicle control unit configured to control the electric motor,
the vehicle body is runnable when electric power is supplied to the electric motor from the vehicle-body-side power feeding connector, and
the battery pack includes:
   a casing removably mounted to the vehicle body;
   a battery accommodated in the casing and serving as a power supply for the electric motor;
   a step-down circuit accommodated in the casing and configured to step down a voltage of the battery;
   a running-phase power feeding connector provided on the casing, electrically connected to the battery, and electrically connectable to the vehicle-body-side power feeding connector in a state where the casing is mounted to the vehicle body;
   an in-storage charging connector provided on the casing, disposed at a position different from that of the running-phase power feeding connector, electrically connected to the battery, and electrically connectable to an external power supply; and
   a battery monitoring unit accommodated in the casing and configured to monitor a state of the battery when the battery pack is in storage separated from the electric vehicle, wherein
   the battery monitoring unit operates when the voltage that has been stepped down by the step-down circuit is applied to the battery monitoring unit.

2. The electric vehicle according to claim 1, wherein the vehicle body includes:
   a vehicle-body-side electric component configured to operate at a first voltage lower than a drive voltage of the electric motor; and
   a vehicle-body-side input connector configured to supply electric power to the vehicle-body-side electric component, and
the battery pack includes:
   a pack-side input connector configured to supply electric power to the battery monitoring unit, wherein
   the battery monitoring unit is configured to operate at a second voltage lower than the drive voltage.

3. The electric vehicle according to claim 2, wherein the battery pack includes:
   an output-side connector electrically connected to the vehicle-body-side input connector in a state where the casing is mounted to the vehicle body, the output-side connector being configured to supply electric power whose voltage has been stepped down by the step-down circuit to the vehicle-body-side input connector.

4. The electric vehicle according to claim 3, wherein the output-side connector is in proximity to the vehicle-body-side input connector in a state where the casing is mounted to the vehicle body, and
at least one of the output-side connector and the vehicle-body-side input connector is connected to a body side thereof via a flexible cable.

5. The electric vehicle according to claim 1, wherein the running-phase power feeding connector is in proximity to the vehicle-body-side power feeding connector in a state where the casing is mounted to the vehicle body, and
at least one of the running-phase power feeding connector and the vehicle-body-side power feeding connector is connected to a body side thereof via a flexible cable.

6. The electric vehicle according to claim 1, wherein a pack accommodating space, in which the battery pack is accommodated, is formed in the vehicle body, and
an area that includes the pack accommodating space and a space above the pack accommodating space is formed such that, in the area, a dimension in a forward and rearward direction increases in an upward direction.

7. A battery pack for use in a saddle-riding electric vehicle, the battery pack being mounted to a vehicle body, the vehicle body including a wheel, an electric motor configured to drive rotation of the wheel, a vehicle-body-side power feeding connector configured to supply electric power to the electric motor, and a vehicle control unit configured to control the electric motor, the battery pack comprising:
a casing removably mounted to the vehicle body;
a battery accommodated in the casing and serving as a power supply for the electric motor;
a step-down circuit accommodated in the casing and configured to step down a voltage of the battery;
a running-phase power feeding connector provided on the casing, electrically connected to the battery, and electrically connectable to the vehicle-body-side power feeding connector in a state where the casing is mounted to the vehicle body;
an in-storage charging connector provided on the casing, disposed at a position different from that of the running-phase power feeding connector, electrically connected to the battery, and electrically connectable to an external power supply; and
a battery monitoring unit accommodated in the casing and configured to monitor a state of the battery when the battery pack is in storage separated from the electric vehicle, wherein
the battery monitoring unit operates when the voltage that has been stepped down by the step-down circuit is applied to the battery monitoring unit.

8. The electric vehicle according to claim 1, wherein the battery monitoring unit is an electronic device configured to monitor a state of charge and a temperature of the battery as the state of the battery.

9. The electric vehicle according to claim 1, wherein the vehicle body includes:
a low-voltage battery configured to store electric power whose voltage has been stepped down by the step-down circuit; and
a vehicle-body-side electric component configured to operate at a voltage lower than a drive voltage of the electric motor, and
the low-voltage battery serves as a power supply for the vehicle-body-side electric component.

10. The electric vehicle according to claim 1, wherein the battery pack is accommodated in the casing, and
the battery included in the battery pack is configured to store electric power, wherein the voltage of the battery has been stepped down to a low voltage by the step-down circuit.

11. The electric vehicle according to claim 1, wherein the battery monitoring unit is communicably connected to the vehicle control unit in a state where the battery pack is mounted to the vehicle body.

12. The electric vehicle according to claim 1, wherein the vehicle body includes:
a vehicle-body-side electric component configured to operate at a voltage lower than a drive voltage of the electric motor;
a vehicle-body-side input connector configured to supply electric power to the vehicle-body-side electric component; and
a vehicle-body-side communication connector connected to the vehicle control unit, the battery pack includes:
a pack-side output connector connected to the vehicle-body-side input connector in a state where the casing is mounted to the vehicle body, the pack-side output connector being configured to supply electric power whose voltage has been stepped down by the step-down circuit to the vehicle-body-side input connector; and
a pack-side communication connector connected to the vehicle-body-side communication connector in a state where the casing is mounted to the vehicle body, the pack side communication connector enabling bidirectional information transmission between the vehicle control unit and the battery monitoring unit, the vehicle-body-side input connector and the vehicle-body-side communication connector form a single vehicle-body-side integrated connector, and the pack-side output connector and the pack-side communication connector form a single pack-side integrated connector, which is configured to be attached to and detached from the vehicle-body-side integrated connector.

13. The electric vehicle according to claim 1, wherein the running-phase power feeding connector is positioned at a higher elevation than a casing-placement surface of the casing.

\* \* \* \* \*